Patented Oct. 13, 1931

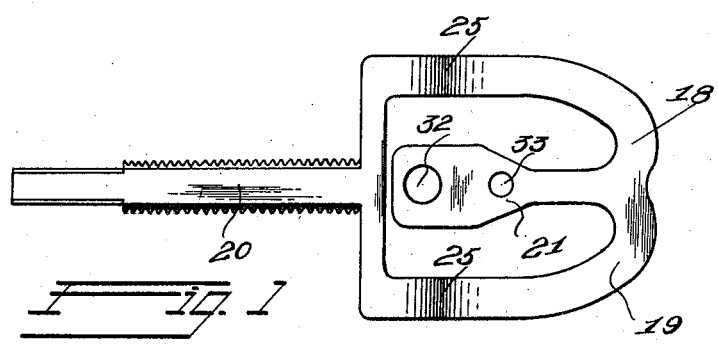
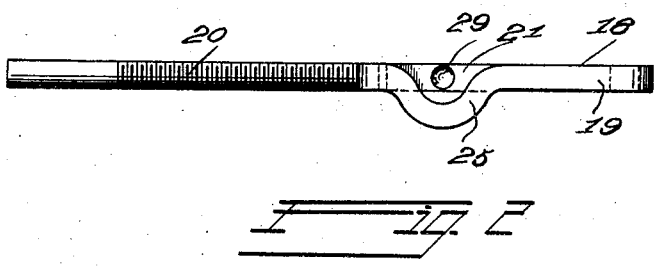
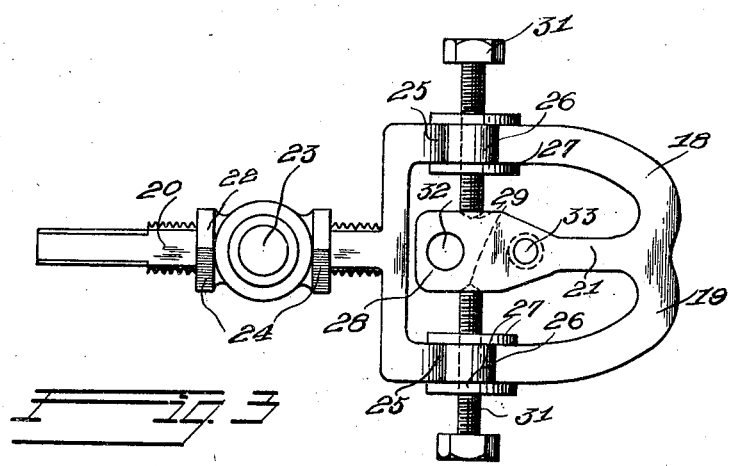

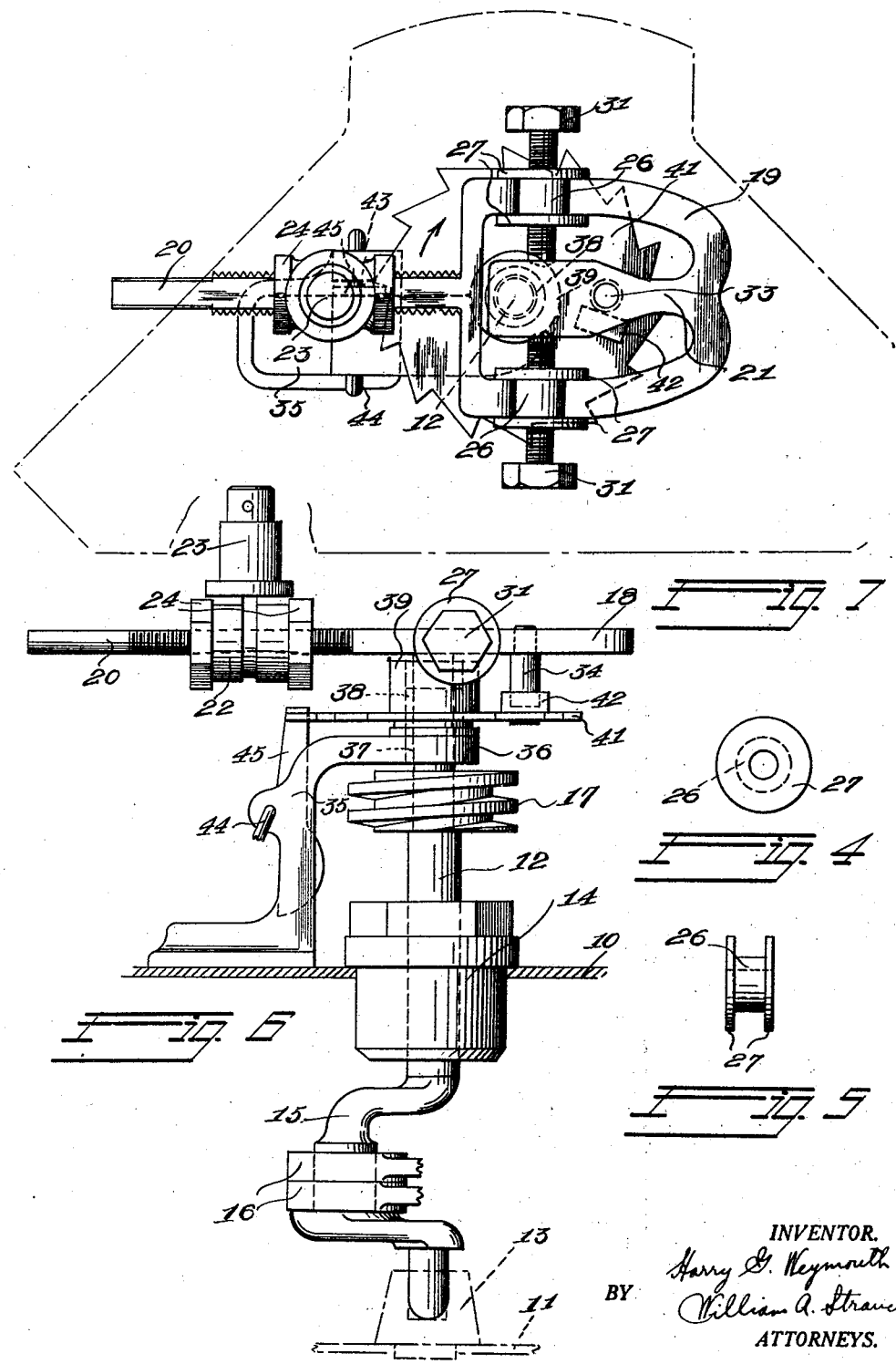

1,826,850

UNITED STATES PATENT OFFICE

HARRY G. WEYMOUTH, OF PITTSBURGH, PENNSYLVANIA, ASSIGNOR TO PITTSBURGH EQUITABLE METER COMPANY, OF PITTSBURGH, PENNSYLVANIA, A CORPORATION OF PENNSYLVANIA

ADJUSTABLE TANGENT ARM FOR GAS METERS

Application filed March 30, 1928. Serial No. 265,905.

The present invention relates to gas meters and more particularly to improved adjustable meter tangents and means for adjusting the position of meter tangent arms in order that the meter will register accurately.

In assembling gas meters it is necessary to adjust the tangent post on the tangent arm to compensate for variations in the volume of the gas chamber or chambers; and it is likewise necessary to adjust the angular position of the tangent post relative to the crank shaft for the purpose of causing the meter to register correctly on varying rates of flow. The first mentioned adjustment is accomplished by adjusting the position of the tangent post on the tangent arm so that the post is moved toward or away from the center of the crank shaft, which operates the valves as well as the registering mechanism of the meter. This adjustment is well understood in the meter art and is ordinarily made after the angular adjustment, or what may be termed the valve setting adjustment of the meter, has been made. The so-called valve setting adjustment is accomplished by changing the position of the tangent post around the crank shaft until a position is reached which causes the meter to register accurately on different rates of flow. The production of simple, effective and reliable means for accomplishing this adjustment is the subject matter of the present invention.

Such angular adjustments have been heretofore made in tin meter constructions by soldering the tangent arm in place, assembling the meter, putting it on test, noting the discrepancy as indicated by the registering mechanism on several different rates of flow, then unsoldering the tangent from the crank shaft, shifting its position and finally resoldering in the new position. Repeated adjusting operations of this character were usually necessary before reasonably accurate adjustment could be made. In addition to the difficulty in making such an adjustment, the heat required in resoldering the tangent to the crank shaft frequently injured either the tangent arm or the crank shaft, or both, with the possibility of solder or acid dropping into the assembled parts and thereby damaging or detrimentally affecting the meter. In addition, making an adjustment in this way tended to affect the alinement of the tangent post relative to the flag arm links, thus causing binding of the parts and seriously affecting the accuracy of the meter. Various constructions have been proposed to overcome the objectionable soldering adjustment described by means of which the tangent post is adjusted angularly relative to the crank shaft without resorting to unsoldering or disconnecting the tangent post from the crank shaft. Such prior constructions are, however, more or less complicated, expensive and unreliable.

It is accordingly a primary object of the present invention to provide a simplified tangent arm and post construction which lends readily to easy and accurate adjustment.

Another object of the invention is to provide a resiliently adjustable tangent arm construction of simple construction and so formed as to permit production accurately and in quantities from sheet metal at comparatively small cost.

With the above objects in view as well as others that will become apparent from the following disclosure, reference will be had to the accompanying drawings forming a part thereof, and in which Figure 1 is a top plan view of a stamping forming the body portion of a preferred form of my improved tangent arm construction.

Figure 2 is an edge view thereof.

Figure 3 is a top plan view of the preferred completed tangent arm with the tangent post in position.

Figure 4 is an end view of a tapped bushing constituting one of the elements of the tangent arm.

Figure 5 is an edge elevation of said bushing.

Figure 6 is a side elevational view of the tangent arm and post shown in assembled position on a crank shaft and in co-operation with a reverse limiting means, and Figure 7 is a top plan view of the construction shown in Figure 6.

Referring to the drawings by reference characters in which like characters designate like parts, 10 designates the top of the valve cover and 11 the meter chamber cover of a meter of any well known construction. As illustrated in Figures 6 and 7 a crank shaft 12 has a bearing at the inner end thereof in a step bearing 13 mounted in cover 11 and at an intermediate point thereof has a bearing in a white metal stuffing box 14 mounted in cover 10. Crank shaft 12 intermediate covers 10 and 11 is provided with the usual crank 15 having connected therewith the ends of valve actuating arms 16 in well known manner. Outward of stuffing box 14 shaft 12 is provided with the usual indicating mechanism actuating worm 17 and has soldered on or secured to the outer end thereof the tangent arm 18 which forms the subject matter of the present application.

Tangent arm 18 as illustrated in Figures 1 and 2 comprises a one piece metal stamping preferably of about $\frac{3}{32}$ inch brass consisting of a yoke 19, an arm 20 and a centrally disposed tongue 21 having the inner end thereof with the inner end of yoke 19 and the opposite end free and spaced from the opposite end of yoke 19.

As will be seen from Figures 1 and 3 tongue 21 extends from the arch of the yoke and arm 20 extends from the base of the yoke in the same direction as tongue 21.

Arm 20 is flattened as illustrated and screw threaded and extends through a slot in base 22 of the adjustable tangent post 23 (Figure 3) to which the flag arms are pivotally attached in well known manner. Base 22 and post 23 are held in adjusted position on arm 20 by means of lock nuts 24.

Yoke 19 adjacent the base thereof and on opposite sides in transverse alinement with the enlarged end of tongue 21 is depressed as indicated at 25 in substantially semi-circular depressions.

Tapped bushings 26 (Figures 3, 4 and 5) provided with locating end flanges 27 are placed in depressions 25 with the flanges 27 engaging opposite sides of the side members of the yoke and are soldered in the depressions. Bushings 26 are accordingly disposed in transverse alinement with the widened portion 28 of tongue 21 which is provided with shallow depressions 29 on opposite edges thereof in axial alinement with the tapped holes in bushings 26 and in which the ends of adjusting set screws 31 adjustably threaded in bushings 26 nest. Tongue 21 is provided with an aperture 32 to receive the outer end of crank shaft 12 to which the tongue is secured by soldering or in any other suitable manner.

As yoke 19 is constructed of relatively light material and tongue 21 is connected to the arch of the yoke by a relatively narrow neck portion, tongue 21 will be resilient or yieldable with respect to the sides of yoke 19, and by adjusting screws 31 one way or the other arm 20 will be moved angularly with relation to tongue 21 and consequently with relation to crank shaft 12. Adjustment of screws 31 accordingly effects an angular or valve setting adjustment of arm 20. Tongue 21 is preferably apertured as at 33 for the reception of a pin 34 (Figures 6 and 7) for engagement with the reverse motion limiting and stop means disclosed and claimed in my co-pending application, Serial No. 261,798 filed March 15, 1928, which comprises a bracket 35 secured to cover 10 and having an extension 36 apertured at 37 to receive a stationary bushing 38 through which the outer end of crank shaft 12 extends. Rotatably mounted on bushing 38 is the hub 39 of a ratchet 41 adapted to be engaged by pin 34. Pivotally mounted in a bifurcation 43 of bracket 35 as indicated at 44 is a gravity pawl 45 the outer end of which normally engages the teeth of ratchet 41. As arm 20 moves forward or in the direction indicated by the arrow in Figure 7 pawl 45 will oscillate back and forth without impeding the movement of ratchet 41 which is rotated by engagement of pin 34 with lug 42. Should the tangent arm movement be reversed pin 34 will move away from lug 42 and after substantially one reverse revolution of tangent arm will engage the opposite side of lug 42 and will tend to rotate ratchet 41 in the reverse direction. Reverse movement of ratchet 41 will be prevented by engagement of pawl 45 with the radial edge of the adjacent tooth of the ratchet wheel.

From the foregoing disclosure it will be seen that a novel adjustable tangent arm and post construction for meters is provided that is simple in construction, and effective and reliable in operation. The construction disclosed not only satisfies the requirements of a device of this character but it is so constructed as to render it inexpensive in manufacture since the arm construction is formed by stamping operation less expensive than casting and providing a lighter more resilient and more satisfactory construction. The set of screw bearings herein disclosed as bushings 26 can be inexpensively and automatically made by quantity production methods separately and are cheaply secured to the stampings as above described.

It will be apparent to those skilled in the art that various changes, modifications, and alterations may be made in the construction illustrated without departing from the spirit and scope of my invention as set forth in the appended claims.

What I desire to secure by Letters Patent, and claim is:—

1. In combination with the crank shaft of a meter, a tangent arm construction comprising a sheet metal stamping having a closed yoke member, a resilient crank-shaft engaging tongue integral with said yoke member and having a free end projecting into the same, said yoke member adjacent the free end of said tongue having depressions stamped therein, bushings secured within said depressions, and an adjusting screw threaded through each bushing and engaging opposite sides of said tongue.

2. The invention as defined in claim 1 wherein said bushings are each provided with flanges engageable on opposite sides of the depressed portions of said yoke.

3. The invention as defined in claim 1 wherein said bushings are fixedly secured to said yoke by soldering.

4. A tangent arm construction for interconnecting the tangent posts and crank shafts of gas meters comprising a sheet metal stamping provided with a closed yoke portion, a tongue extending into and integral with said yoke and having a free end adapted to be secured to the crank shaft of a meter, an arm integral with the yoke and projecting laterally therefrom adapted to be adjustably secured to a tangent post, and transverse adjusting members secured to said yoke and engaging the opposite sides of said tongue, whereby the sheet metal tongue may be readily flexed with respect to said yoke for adjustment thereof.

In testimony whereof I affix my signature.

HARRY G. WEYMOUTH.